United States Patent Office 3,133,924
Patented May 19, 1964

3,133,924
AMINO-SUBSTITUTED CYCLOBUTANE CARBOXAMIDES
Armin G. Wilson, Highland Park, and Leonard Weintraub, South River, N.J., assignors to Bristol-Myers Company, New York, N.Y., a corporation of Delaware
No Drawing. Filed May 31, 1960, Ser. No. 32,513
24 Claims. (Cl. 260—268)

This invention relates to novel cyclobutane derivatives. More specifically, this invention relates to novel cyclobutane carboxamide derivatives.

The novel cyclobutane carboxamide derivatives of this invention can be represented by the following generic formula:

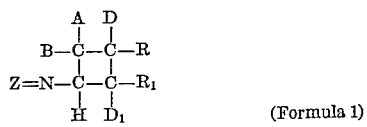

(Formula 1)

wherein each of A and B represent a (lower) alkyl radical; each of R and $R_1$ represent hydrogen or a carboxamide radical, provided that at least one of R or $R_1$ is a carboxamide radical; each of D and $D_1$ represent hydrogen or the phenyl radical; and Z=N— represents an amino radical with the letter N representing nitrogen.

The (lower) alkyl radicals as represented by A and B can be any (lower) alkyl radical containing from 1 to 4 carbon atoms, e.g., methyl, ethyl, propyl, isopropyl, butyl, tertiary butyl and the like. It is preferred that A and B represent (lower) alkyl radicals containing from 1 to 2 carbon atoms.

The amino radical Z=N— stands for an amino group such as the primary amino, secondary (lower) alkyl amino, tertiary (lower) dialkyl amino, or a heterocyclic amino radical. Illustrative of the (lower) alkyl amino radicals there can be mentioned the methylamino, ethylamino, propylamino, isopropylamino, butylamino, t-butylamino and the like. Illustrative of the (lower) dialkylamino radicals there can be mentioned dimethylamino, diethylamino, dipropylamino, dibutylamino, methylethylamino, methylisopropylamino and the like. The heterocyclic amino radical can be one which contains but a single nitrogen atom, i.e., 1-piperidyl or a heterocyclic amino radical which contains in addition to the one nitrogen atom, additional heterocyclic atoms such as nitrogen, oxygen or sulfur. It is preferred that the heterocyclic amino radical be a saturated 5 or 6 membered ring monocyclic radical. Illustrative of the heterocyclic amino radicals there can be mentioned those containing one nitrogen atom, e.g., 1-piperidino or 1-pyrolidino, those containing two nitrogen atoms, e.g., 1-piperazino, and those containing hetero atoms in addition to the nitrogen such as 1-morpholino or 1-thiomorpholino and the like. It is preferred that the amino radical represented by Z=N— be a dialkylamino radical having from 1 to 2 carbon atoms.

The carboxamide radical as represented by at least one of R or $R_1$ can be the primary carboxamide radical

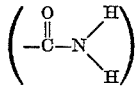

or a secondary or tertiary carboxamide radical, wherein the substituents on the amide nitrogen are hydrocarbon radicals having from 1 to about 8 carbon atoms or even substituted hydrocarbon radicals having from 1 to about 8 carbon atoms wherein the hydrocarbon radical is further substituted with nonhydrocarbon radicals or elements. The hydrocarbon or substituted hydrocarbon substituents on the amide nitrogen can be substituents selected from aliphatic hydrocarbons, e.g., alkyl or alkene radicals, particularly (lower) alkyl or (lower) alkene; the phenyl radical; (lower) alkphenyl radicals; (lower) phenalkyl radicals; (lower) hydroxyalkyl; (lower) alkoxyphenyl; hydroxyphenyl and the like. Illustrative of the carboxamide radicals there can be mentioned the primary carboxamide radical; secondary carboxamide radicals such as N-methyl carboxamide; N-ethyl carboxamide; N-isopropyl carboxamide; N-allyl carboxamide; N-phenyl carboxamide; N-benzyl carboxamide; N-phenethyl carboxamide; N-hydroxymethyl carboxamide; N-2-hydroxyethyl carboxamide; N - 3 - hydroxypropyl carboxamide; N - 2 - dimethylaminoethyl carboxamide; N - 3 - dimethylaminopropyl carboxamide; N-(p-ethoxyphenyl) carboxamide; N-(p-methoxyphenyl) carboxamide and tertiary carboxamide radicals such as N,N-dimethyl carboxamide; N,N-diethyl carboxamide; N-methyl-N-propyl carboxamide; N,N-diallyl carboxamide; N,N-diphenyl carboxamide; N,N-dibenzyl carboxamide; N,N'-di(p-tolyl) carboxamide; N,N-di(2-hydroxyethyl) carboxamide; N,N - di(p-hydroxyphenyl) carboxamide and the like. Since the cyclobutane ring can have two carboxamide substituents (R and $R_1$) each of the substituents can be a carboxamide as illustrated above and specifically, e.g. N,N-N',N'-tetraethyl dicarboxamide. The nomenclature of primary, secondary or tertiary carboxamides as employed herein is much like that employed with organic amines; thus, the amide nitrogen of the primary carboxamide carries 2 hydrogen atoms; the amide nitrogen of the secondary carboxamide carries but one hydrogen atom and the second hydrogen atom as found in the primary carboxamide is substituted with a radical such as a (lower) alkyl; whereas in the tertiary carboxamide the two hydrogen atoms of the primary carboxamide have been substituted with organic radicals such as the (lower) alkyls. The term "(lower) alkyl" as used in this application is intended to refer to an alkyl radical having from 1 to 4 carbon atoms. Also, the term "(lower) alkyl" when used in combination with another group refers to the alkyl portion containing from 1 to 4 carbon atoms, e.g., (lower) alkoxy, (lower) phenalkyl, etc.

A preferred generic formula of the novel cyclobutane carboxamide derivatives of this invention is:

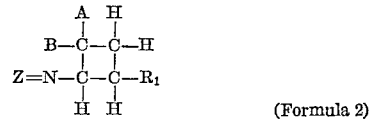

(Formula 2)

wherein each of A and B is an alkyl radical containing from 1 to 2 carbon atoms; Z=N— is a dialklamino radical having from 1 to 2 carbon atoms in each alkyl group and $R_1$ is a carboxamide radical.

Illustrative of specific cyclobutane carboxamides of this invention there can be mentioned:

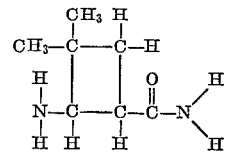

2-amino 3,3-dimethyl cyclobutane carboxamide

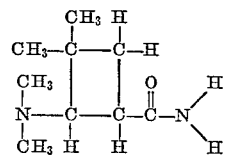

2-dimethylamino 3,3-dimethyl cyclobutane carboxamide

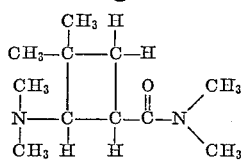

N,N-dimethyl 2-dimethylamino 3,3-dimethyl cyclobutane carboxamide

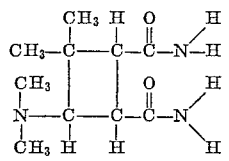

3-dimethylamino 4,4-dimethyl cyclobutane 1,2-dicarboxamide

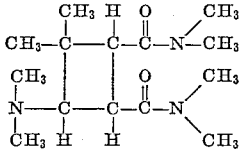

N,N-N',N'-tetramethyl 3-dimethylamino 4,4'-dimethyl cyclobutane 1,2-dicarboxamide

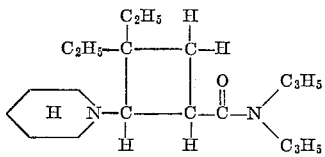

N,N-diallyl 2-(1-piperidyl) 3,3-diethyl cyclobutane carboxamide

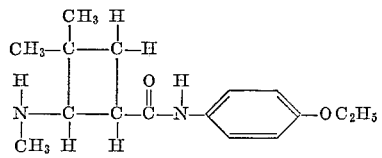

N-(p-ethoxyphenyl) 2-methylamino 3,3-dimethyl cyclobutane carboxamide

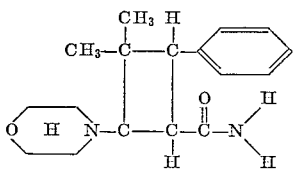

2-(1-morpholino) 3,3-dimethyl 4-phenyl cyclobutane carboxamide

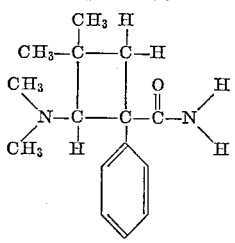

2-dimethylamino 3,3-dimethyl 1-phenyl cyclobutane carboxamide

In addition to the above illustrated cyclobutane carboxamide derivatives of this invention there can also be mentioned: 2-tertiary butylamino 3,3-diethyl cyclobutane carboxamide; N - phenyl 2 - ethylamino 3,3 - diisopropyl cyclobutane carboxamide; N - isopropyl 2 - amino 3,3-dimethyl 1 - phenyl cyclobutane carboxamide; 2-dimethylamino 3,3 - dimethyl 4 - phenyl 1 - phenyl cyclobutane carboxamide; N,N - di(p-hydroxyphenyl) 2-(1-piperazyl) 3 - methyl 3 - ethyl cyclobutane carboxamide; N,N-N',N'-tetraethyl 3 - diethylamino 4,4-dimethyl cyclobutane 1,2-dicarboxamide; 3-(1-thiomorpholino) 4,4 - dimethyl 1,2-diphenyl cyclobutane - 1,2 - dicarboxamide; N-hydroxymethyl 2-dimethylamino 3,3-dimethyl cyclobutane carboxamide; N,N - di(2-hydroxyethyl) 2 - methyl isopropylamino 3,3-dibutyl cyclobutane carboxamide; N,N-di(p- methoxyphenyl) 2-methylamino 3,3-dimethyl 4 - phenyl cyclobutane carboxamide; N,N-N',N'-tetra (2-hydroxyethyl) 3-isopropylamino 4,4-diisopropyl cyclobutane 1,2-dicarboxamide; N-(p-hydroxyphenyl) 2 - amino 3,3-dimethyl cyclobutane carboxamide; N-hydroxymethyl; N-2-hydroxyethyl 2-isobutylamino 3,3-dimethyl cyclobutane carboxamide and the like.

The novel carboxamide derivatives of this invention have utility as therapeutic agents in pharmacological compositions such as those of analgesics and central nervous system depressants, e.g., as sedatives. Furthermore, the carboxamide derivatives can be used as sludge and color stabilizers in fuel oil and in combination with phenolic materials are useful as antioxidants in cracked gasoline. Thus, cracked gasoline containing 0.005% by weight of p-n-butylaminophenol plus 0.001% by weight of one of the carboxamides of this invention, e.g., N-methyl 2-dimethylamino 3,3 - dimethyl cyclobutane carboxamide, shows improved stability over gasoline which does not contain the combination of the p-n-butylaminophenol and the carboxamide. When the novel carboxamide derivatives of this invention are used as color or sludge stabilizers in fuel oil they can be used in concentrations equivalent to 50 pounds of a carboxamide derivative per 1000 barrels of oil.

Either the carboxamide derivatives of this invention or their non-toxic acid addition salts can be administered by the conventional methods, the conventional types of unit dosages or with the conventional pharmaceutical carriers to produce a central nervous system depressant effect, or an analgesic effect in human beings and animals. By the term pharmaceutical carrier we intend to include non-analgesic materials which are conventionally used with analgesics and include fillers, diluents, binders, lubricants, disintegrating agents and solvents. Conventional methods of administration of the analgesics include oral or parenteral administration. Oral administration by the use of tablets, capsules or in liquid form such as suspensions, solutions or emulsions is particularly advantageous since the novel carboxamides are rapidly absorbed from the gastrointestinal tract. When formed into tablets, the conventional binding and disintegrating agents such as those used in analgesic unit dosages can be employed. Illustrative of binding agents there can be mentioned glucose, gum acacia, gelatin and starch paste. Illustrative of disintegrating agents there can be mentioned corn starch, keratin and potato starch. When administered as liquids the conventional liquid carriers can be used.

The acid addition salts are formed by the conventional techniques of neutralizing the amine portion of a compound with either an organic or inorganic acid. Illustrative of the acids there can be mentioned hydrochloric, sulfuric, citric, acetic, malic, maleic and phosphoric acids.

The unit dosage or therapeutically effective quantity of the cyclobutane carboxamide derivatives for human beings can vary over wide limits such as that of about 0.1 of a grain to about 25 grains or more such as 100 grains. The upper limit is determined only by the degree of effect desired and economic considerations. For oral administration it is preferably to employ from about 1 to about 10 grains per unit dosage. When administered parenterally, it is preferable to employ about 0.10 to about 2 grains. Each unit dosage form of the novel therapeutic compounds can contain from about 5% to about 95% and preferably from about 10% to about 80% of the novel compounds by weight of the entire composition with the remainder comprising a significant quantity, e.g., at least about 5% of a conventional pharmaceutical carrier. Of course, it is possible to administer the novel carboxamides, e.g., the pure compounds or their acid addition salts, without the use of a pharmaceutical carrier. It is indicated from animal experiments that about 2 to about 8 grain dosages administtered orally four times daily as needed will provide a preferred daily dosage. Of course, the dosage of the particular carboxamide employed can very considerably, in accordance with the age of the patient and the degree of therapeutic effect desired. When the carboxamide derivatives of this invention are employed for one of their enumerated utilities such as analgesics for the amelioration of pain such as the common headache, mild rheumatism and the like, they can be administered either prior to or after the onset of the discomfort.

When the carboxamide derivatives of this invention are used as analgesics they show a more prolonged analgesic effect than other analgesicly active cyclobutane derivatives such as methyl 2-dimethylamino 3,3-dimethyl cyclobutane carboxylate.

The therapeutic use of the novel compounds of this invention is illustrated by the following examples of suitable analgesic compositions in unit dosage form although it is not intended that the compositions or dosages be limited by any of the proportions, amounts, types of carriers or dosage units set forth therein.

Example 1

A suitable formulation of tablets consists of:

| | Grams |
|---|---|
| (1) 2-dimethylamino 3,3-dimethyl cyclobutane carboxamide | 12.5 |
| (2) Lactose | 30 |
| (3) Starch | 5 |
| (4) Magnesium stearate | 2 |

The carboxamide derivative, lactose and starch are thoroughly mixed and granulated. For tabletting, the magnesium stearate is added, mixed with the granules and the mixture tabletted on a rotary press. Use of this procedure produces 100 tablets each containing 125 mg. of the active analgesic agent.

Example 3

Another suitable formulation of tablets consist of:

| | Grams |
|---|---|
| (1) N-ethyl 2-dimethylamino 3,3-dimethyl cyclobutane carboxamide | 25 |
| (2) b-Lactose | 20 |
| (3) Dextrin | 10 |
| (4) Hydrogenated vegetable oil | 0.5 |
| (5) Talc | 2 |

The carboxamide derivative, b-lactose and dextrin are thoroughly mixed and granulated. For tabletting, the hydrogenated vegetable oil and talc are added, mixed with the granules and the mixture tabletted on a rotary press. Use of this procedure produces 200 tablets with each tablet containing 125 mg. of the active analgesic agent.

Example 4

| | Grains |
|---|---|
| (1) 2-dimethylamino 3,3-dimethyl cyclobutane carboxamide | 4 |
| (2) Carbowax 6000 | 1 |
| (3) Colloidal silica (solid powder) | 3 |

The carboxamide derivative is intimately admixed with the Carbowax. The silica is then added to the Carbowax and thoroughly mixed and granulated. For tabletting, the mixture is tabletted by pressing the mixture into a sheet with a die having score marks so as to produce a flat sheet with scored lines to provide four easily detachable tablets of the same size. Use of this procedure produces a tablet containing four grains of the analgesic agent. The tablet can be subdivided on the scored lines to give four tablets, each containing one grain of the analgesic agent.

Example 5

A suitable formulation of oral elixir consists of:

| | | |
|---|---|---|
| (1) The citric acid salt of 2-amino 3,3-dimethyl cyclobutane carboxamide | grams | 475.2 |
| (2) Aromatic elixir base to make | liters | 74.5 |

Base contains: orange spirits, sugar syrup, ethyl alcohol and distilled water

Use of the above formulation will make 100-pint bottles of oral elixir. Each bottle contains approximately 100 one-teaspoon doses. Each dose contains 50 mg. of active analgesic salt.

The novel cyclobutane carboxamides of this invention having a tertiary amino group can be prepared by reacting a methanolic solution of (a) ammonia, or a primary amine, or a secondary amine, and (b) sodium methoxide with (c) a tertiary amino ester or diester as represented by the following generic formula (Formula 3):

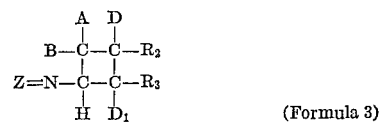

(Formula 3)

wherein each of the letters A, B, Z=N—, D and $D_1$ represent the same radicals as discussed for their respective letters in Formula 1, and each of $R_2$ and $R_3$ are hydrogen or a (lower) alkoxycarbonyl radical, e.g., methylcarboxylate

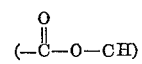

provided that at least one of $R_2$ or $R_3$ is a (lower) alkoxycarbonyl radical. During the reaction the alkoxy group of the ester radical is replaced by the ammonia, primary amine or secondary amine reactant. In conducting this reaction about one mole of sodium methoxide is employed per mole of the cyclobutane monoester whereas about two moles of sodium methoxide are employed per mole of the cyclobutane diester. The amount of methanol employed is in slight excess or equivalent to that required to dissolve the sodium methoxide and the cyclobutane ester of generic Formula 3 at about 0° C. This solution is also saturated with the ammonia or amine at about 0° C. The reaction is run at the autogenous pressures (about 200 to about 800 p.s.i.) developed in an autoclave for periods of time varying from about 18 hours to about 72 hours and temperatures of from about 100° C. to about 150° C. In order to prepare the cyclobutane carboxamides wherein both the amino and amide groups are primary, stoichiometric quantities of a (lower) dialkylamino compound of Formula 3, are reacted with ammonia in the same fashion as described above for producing the tertiary amino carboxamides, except for the absence of sodium methoxide. To obtain the cyclobutane carboxamides of this invention wherein both the amine portion and amide portion are secondary, the above process for producing cyclobutane carboxamides wherein both the amino and amide groups are primary is followed except that the amine reactant is a primary amine instead of ammonia.

The following reaction is illustrative of the preparation of compounds wherein both the amino and amide groups are secondary and substituted with the same alkyl group:

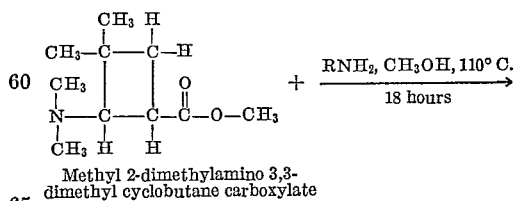

Methyl 2-dimethylamino 3,3-dimethyl cyclobutane carboxylate

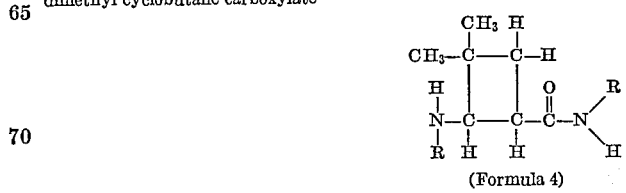

(Formula 4)

wherein R is a hydrocarbon radical such as a (lower) alkyl radical. In order to produce a carboxamide wherein the amide and amine portions are secondary and the radicals attached respectively to the amine nitrogen and to the amide nitrogen differ, then a (lower) dialkylamino-secondary carboxamide is reacted in the same fashion described above for producing the carboxamides having a secondary amino and secondary amide group except that the starting material is a (lower) dialkylamino-secondary amide compound. To obtain the corresponding secondary amino unsubstituted amide of Formula 4, then a (lower) 2-dialkylamino-3,3-(lower) dialkyl cyclobutane carboxamide is reacted with a primary amine under the same reaction conditions as described for producing the generic compound of Formula 4. This can be illustrated by the following equation when the carboxamide reactant is 2-dimethylamino 3,3-dimethyl cyclobutane carboxamide and the amine reactant is methylamine:

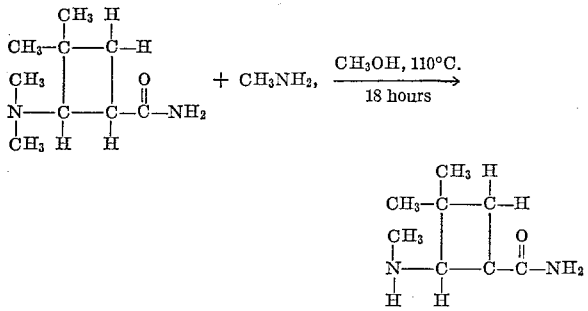

The cyclobutane carboxamides are recovered from the reaction mixture by removal of solvent and excess amine under vacuum or other conventional means such as filtration or vacuum distillation, extracting the carboxamide from the residue with an organic solvent such as ethyl acetate and finally evaporating the solvent to recover the carboxamide.

The novel cyclobutane carboxamides of this invention can also be produced by reacting either ammonia or an organic amine, dissolved in water and preferably in an inert solvent such as anhydrous ether with an acid addition salt of a cyclobutyl acid chloride having the generic formula:

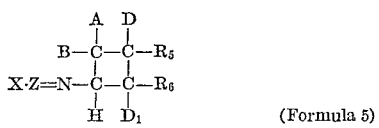

wherein the letters A, B, D and $D_1$ represent the same radicals as the identical letters in Formula 1, Z=N— represents a tertiary amine as in Formula 1; X represents an acid and $R_5$ and $R_6$ are hydrogen or the acid chloride

radical, provided that at least one of $R_5$ and $R_6$ is the acid chloride radical. The reaction is conducted by slowly adding the acid addition salt of a cyclobutyl acid chloride of Formula 5 to a solution of excess ammonia or amine in a solvent such as anhydrous ether at temperatures of about 0° C. and allowing the reaction mixture to warm to room temperature with constant stirring. The amide products are recovered from the reaction mixture by conventional techniques. Thus, in the reactions employing aliphatic amines or ammonia the amide product is separated by filtering the reaction mixture and evaporating, in vacuo, the ether filtrate which contains the product. In the reactions employing aromatic amines wherein anhydrous ether is the solvent, the acid addition salt of both the amide product and amine reactant is recovered in the residue of the reaction mixture and the amide is separated from the residue by making an aqueous solution of the residue and separating the amide product from the solution by precipitation with sodium bicarbonate.

The cyclobutyl acid chlorides of Formula 5 can be prepared by reacting an acid addition salt such as the hydrochloride of a compound represented by Formula 3, except that the ester or ester radicals of Formula are hydrolyzed to the carboxylic acid, with an equivalent quantity of phosphorus pentachloride with or without the use of purified carbon tetrachloride as solvent according to the generic equation:

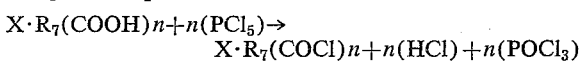

wherein $R_7$ represents the cyclobutane ring and its various substituents as found in Formula 3 except for the ester radical or radicals which were hydrolyzed to the acid, X represents an acid addition salt such as the hydrochloride and $n$ is an integer from 1 to 2. The cyclobutyl acid chloride is recovered by evaporating the reaction mixture in vacuo at about 100° C. to remove solvent and by-product phosphorus oxychloride. The product either crystallizes or can be crystallized by scratching. The hydrochloride salt of the carboxylic acid is prepared by conventional methods such as by refluxing an ester of Formula 3 with three volumes of 4 normal hydrochloric acid for four hours and evaporating the solution to dryness in vacuo. The residue is recrystallized once from absolute ethanol to give pure acid addition salt of the corresponding acid of a cyclobutane compound of Formula 3.

In addition to being chemical intermediates for the production of the cyclobutane carboxamides of this invention, the novel cyclobutyl carbonyl chlorides (acid chlorides) also have utility as herbicides, disinfectants and polymer chain terminators of resins. Illustratively, the cyclobutyl carbonyl chlorides can be intimately admixed with about 3 times their weight of talc and sprayed on undesirable plants such as dandelions. When used as germicides they can be dissolved in water in concentrations of about 1% to about 5% by weight of the carbonyl chloride derivative and applied to materials such as interior walls or floors of buildings in order to eliminate undesirable microorganisms such as gram-positive or gram-negative bacteria. When used as polymer chain terminators about 0.1% to 0.5% by weight of the novel carbonyl chlorides can be added to a monomer feed, such as that of ethylene, or added directly to the polymerization reactor to limit the molecular weight of the polymer produced.

A preferred method for producing the cyclobutane esters of Formula 3 is by reacting enamines such as those derived from secondary amines and aldehydes containing one alpha-hydrogen atom, with certain substituted olefins. This reaction can be illustrated by the following generic equation wherein the letters A, B, Z=N—, D, $D_1$, $R_2$ and $R_3$ are the same radicals as represented by the identical letters in Formula.

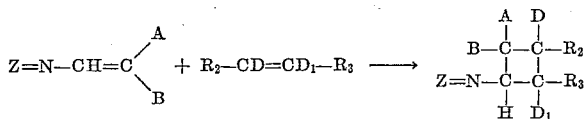

The molar proportion of the enamine reactant to the alkoxycarbonyl group containing olefin reactant can be widely varied as the cyclobutane ester derivative product can be readily separated from excess or unreacted reactants. However, substantially stoichiometric amounts of the reactants are more generally utilized in accordance with usual chemical practice. Enamines such as N,N-dimethylisobutenylamine react with equal molar proportions of such olefins as methyl acrylate as represented by the following equation:

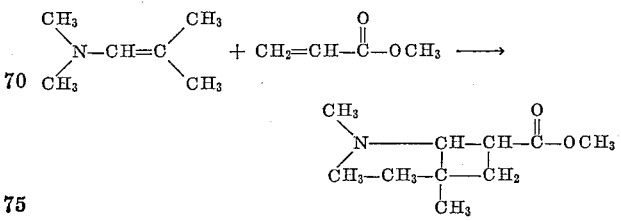

The reaction of enamines and the alkoxy carbonyl substituted olefins to prepare the cyclobutane ester derivatives proceeds readily in the absence of added catalyst materials. The reaction can be conveniently effected by merely combining the reactants at room temperature. Reaction temperatures up to the decomposition of the reactants or the reaction product can be used, although reaction temperatures in the range of about 0° C. to 200° C. are more usually used, with elevated temperatures in the range of about 50° C. to 190° C. often times utilized to facilitate the reaction. Typical reaction times vary from a few minutes to 20 hours depending mainly on the reaction temperature and the reactants employed. However, longer or shorter reaction periods can be utilized. The reaction is conveniently effected under atmospheric pressure, although higher pressures or even subatmospheric pressures can be utilized. The subject reaction can be effected in the absence of a solvent although a solvent that is substantially inert to the reactants and the reaction product can be utilized if desired.

The reaction of the described enamines and olefins containing alkoxycarbonyl groups proceds in high yields to form the described cyclobutane esters. The cyclobutane ester product can be worked-up or purified by conventional purification methods, the preferred method varying with the properties of the product. Particularly effective purification methods include fractional distillation under reduced pressure and fractional crystallization from solvents. However, other purification methods such as solvent extraction, chromatographic adsorption and the like can also be utilized.

Examples 6–14 illustrate the preparation of typical cyclobutane esters of Formula 3 whereas Examples 15–20 illustrate the preparation of some of the starting materials employed in producing the cyclobutane esters of Formula 3:

Example 6

A mixture of N-isobutenylpiperidine (139 g., 1.0 mole) and methyl acrylate (86 g., 1.0 mole) was heated in an autoclave for two hours at 180° C. Distillation of the reaction mixture gave, after removal of the unreacted methyl acrylate and N-isobutenylpiperidine, 157 g. (70% conversion) of the methyl ester of 3,3-dimethyl 2-(1-piperidyl) cyclobutanecarboxylic acid [methyl 2-(1-piperidyl) 3,3-dimethyl cyclobutane carboxylate], M.P. 103° C. at 3.7 mm., $N_D20$ 1.4705.

Example 7

A mixture of N,N-dimethylisobutenylamine (297 g., 3 mole) and methyl acrylate (258 g., 3 mole) was heated for two hours at 170° C. in an autoclave. Distillation of the reaction mixture gave, after removal of unreacted starting materials, 419 grams (75% yield) of the methyl ester of 3,3 - dimethyl - 2-dimethylaminocyclobutanecarboxylic acid (methyl 2-dimethylamino 3,3-dimethyl cyclobutane carboxylate), B.P. 49–50° C. at 1.5 mm., $N_D20$ 1.4448.

Example 8

A one mole proportion of N-isobutenylmorpholine was reacted with a one mole proportion of methyl acrylate for 2 hours at 170° C. in an autoclave. The resulting reaction product was distilled to separate the cyclobutane derivative, methyl 2-(1-morpholino) 3,3-dimethyl cyclobutane carboxylate, B.P. 101–102° C. at 2.2 mm., $N_D20$ 1.4711.

Example 9

A one mole proportion of N,N - di - n-butylisobutenylamine was reacted with a one mole proportion of methyl acrylate for 2 hours at 170° C. in an autoclave. The resulting reaction product was distilled to separate the cyclobutane derivative, methyl 2-di-n-butylamino 3,3-dimethyl cyclobutane carboxylate, B.P. 98° C. at ca. 1.5 mm., $N_D20$ 1.4543.

Example 10

A one mole proportion of N,N-diisobutylisobutenylamine was reacted with a one mole proportion of methyl acrylate for 2 hours at 170° C. in an autoclave. The resulting reaction product was distilled to separate the cyclobutane derivative, methyl 2,2-diisobutylamino 3,3-dimethyl cyclobutane carboxylate, B.P. 93–100° C. at ca. 2 mm., $N_D20$ 1.4510.

Example 11

A mixture of N,N-dimethylisobutenylamine (82 g., 0.83 mole) and diethylmaleate (172 g., 1 mole) was heated under reflux for 18 hours, during which time the temperature of the mixture rose from 105° C. to 162° C. Distillation of the reaction mixture gave, after removal of unreacted starting materials, 150.5 g. (67% yield) of the diethyl ester of 3,3-dimethyl-4-dimethylaminocyclobutane-1,2-dicarboxylic acid [diethyl 3-dimethylamino-4,4-dimethyl-cyclobutane-1,2-dicarboxylate] B.P. 93–94° C. at 1.5 mm., $N_D20$ 1.4502.

Example 12

A mixture of N-isobutenyl piperidine (208.5 g., 1.5 moles) and diethylmaleate (322.5 g., 1.87 moles) was heated at 150° C. for 5½ hours. Distillation of the reaction mixture gave, after removal of unreacted starting materials, 274 g. of the diethyl ester of 3,3-dimethyl-4-(1-piperidyl) cyclobutane-1,2-dicarboxylic acid, B.P. 113–120° C. at 1.0–1.5 mm., $N_D20$ 1.4663.

Example 13

A one mole proportion of N-(2-ethyl-1-butenyl) piperidene was reacted with a one mole proportion of methyl acrylate for 2 hours at 170° C. in an autoclave. The resulting reaction product was distilled to separate the cyclobutane derivative, methyl 3,3-diethyl-2-(1-piperidyl) cyclobutane carboxylate, B.P. 119–121° C. at 2 mm., $N_D20$ 1.4788.

Example 14

A one mole proportion of 1,4-diisobutenylpiperazine and a two mole proportion of methyl acrylate were reacted for 2 hours at 170° C. in an autoclave. The resulting reaction product was triturated with hexane and filtered to give the cyclobutane derivative, 1,4-bis(4-methoxycarbonyl - 2,2 - dimethylcyclobutyl)-piperazine, M.P. 148° C.

Example 15

The preparation of N,N-dibutyl isobutenylamine was accomplished as follows: Isobutyraldehyde (180 g., 2.5 moles) was added over a ⅓ hour period to dibutylamine. The reaction mixture was then refluxed under a Dean-Stark trap for 12 hours during which time 30 ml. of water was collected. Fractional distillation of the mixture gave, after removal of low boilers, 228 g. (63%) of N,N-dibutylisobutenylamine, B.P. 70.5–72° C. at 4.5–5.2 mm., $N_D20$ 1.4409.

Example 16

In a manner similar to that described in Example 15, isobutyraldehyde and diisobutylamine gave N,N-diisobutylisobutenylamine, B.P. 64° C. at 5.8 mm., $N_D20$ 1.4375 in 57% yield.

Example 17

In a manner similar to that described in Example 15, cyclohexanecarboxaldehyde and piperidine gave 1-cyclohexylidenemethyl piperidine, 88° C. at 3 mm., $N_D20$ 1.5042 in 87% yield.

Example 18

In a manner similar to that described in Example 15, 2-ethylbutyraldehyde and piperidine gave N-(2-ethyl-1-butenyl) piperidine, B.P. 103–110° C. at 37–45 mm., $N_D20$ 1.4693 in 87% yield.

Example 19

Over a 2 hour period isobutyraldehyde (400 g., 5 moles) was added to piperazine (172 g., 2 moles) at 35–40° C. The mixture was stirred and refluxed under a Dean-Stark trap for 7 hours, during which time 74 ml. of water was collected. Distillation of the reaction mixture gave, after removal of low boilers, 221 g. (57%) of 1,4-diisobutenyl piperazine, B.P. 70–75° C. at 2 mm., M.P. 35–37° C.

Example 20

A chilled mixture of isobutyraldehyde (288 g., 4 moles), 500 ml. of xylene and 150 g. of anhydrous potassium carbonate was charged to an autoclave. Then dimethylamine (200 g., 4.4 moles) was added and the autoclave was closed and heated at 100° C. for 4 hours. The autoclave was allowed to cool, was vented cautiously and discharged. The mixture was filtered by gravity and the filtrate was distilled to give after removal of unreacted starting materials, 198 g. (50%) of N,N-dimethylisobutenylamine, B.P. 87–89° C., $N_D20$ 1.4219.

Example 21

This example shows the preparation of 2-dimethylamino 3,3-dimethyl cyclobutane carboxamide.

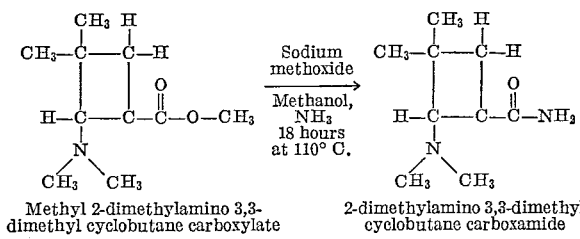

Methyl 2-dimethylamino 3,3-dimethyl cyclobutane carboxylate → 2-dimethylamino 3,3-dimethyl cyclobutane carboxamide A solution containing 2.3 g. (0.1 mole) of sodium, 25 ml. of methanol, 100 ml. of ammonia and 18.5 g. (0.1 mole) of methyl 2-dimethylamino 3,3-dimethyl cyclobutane carboxylate was heated in a 150 cubic centimeter stainless steel autoclave at 110° C. under autogenous pressure for 18 hours. The solution was then evaporated in vacuo below 50° C. to a pasty mass. The mass was treated with 25 ml. of water and the mixture was extracted with four 100 ml. portions of ethyl acetate. The combined ethyl acetate extracts were dried over sodium sulfate and evaporated to dryness in vacuo leaving a residue of 14 g. of solid melting at 127–130° C. This was twice recrystallized from ethyl acetate to give 11.2 g. of white crystals of 2-dimethylamino 3,3-dimethyl cyclobutane carboxamide melting at 144–145° C. This compound has the formula: $C_9H_{18}ON_2$ Mol. Wt. 170.25 with a calculated quantity of C 63.49, H 10.66, N 16.46 and which was found by chemical analysis to be C 63.51, H 10.67 and N 16.4.

Example 22

This example shows the preparation of N-methyl 2-dimethylamino 3,3-dimethyl cyclobutane carboxamide. The hydrochloride salt of 2-dimethylamino 3,3-dimethyl cyclobutane carbonyl chloride (7.2 g., 0.033 mole) was added portionwise to 100 ml. of stirred ice-cold 40% aqueous methylamine solution. The solution was allowed to warm to room temperature and stirred 4 hours. The solution was evaporated to dryness in vacuo. The residue was dissolved in a minimum of water and the solution was made strongly alkaline by the addition of 5 N NaOH. This caused the precipitation of 4.5 g. of white solid which was filtered. This solid was recrystallized twice from ethyl acetate to give 2.5 g. of white crystals of N-methyl 2-dimethylamino 3,3-dimethyl cyclobutane carboxamide ($C_{10}H_{20}ON_2$ Mol. Wt. 184.28) melting at 121–122° C. with a calculated quantity of C 65.17, H 10.94, N 15.20 and which was found by chemical analysis to be C 65.29, H 10.47 and N 15.23.

Example 23

This example shows the preparation of N-ethyl 2-dimethylamino 3,3-dimethyl cyclobutane carboxamide under identical reaction and workup conditions as in Example 22. The reaction between 11.3 g. (0.05 mole) of the hydrochloride salt of 2-dimethylamino 3,3-dimethyl cyclobutane carbonyl chloride and 50 ml. of 70% aqueous ethylamine yielded 6.8 g. of white crystals of N-ethyl 2-dimethylamino 3,3-dimethyl cyclobutane carboxamide ($C_{11}H_{22}ON_2$ Mol. Wt. 198.30 melting at 114–115° C. with a calculated quantity of C 66.62, H 11.18, N 14.13 and which was found by chemical analysis to be C 66.52, H 10.95 and N 14.23).

Example 24

This example shows the preparation of N,N-dimethyl 2-dimethylamino 3,3-dimethyl cyclobutane carboxamide. The hydrochloride salt of 2-dimethylamino 3,3-dimethyl cyclobutane carbonyl chloride (11.3 g., 0.05 mole) was added portionwise to a stirred, Dry Ice acetone cooled solution of 6.8 g. (0.15 mole) of anhydrous dimethylamine in 200 ml. of anhydrous ether. The mixture was transferred to two pressure bottles and shaken at room temperature for two hours. The mixture was filtered free of dimethylamine hydrochloride. The ethereal filtrate was evaporated in vacuo and the residual oil was distilled in vacuo giving, without any fore-run, 9 g. of water white N,N-dimethyl 2-dimethylamino 3,3-dimethyl cyclobutane carboxamide boiling at 71° C. at 0.4 mm. (bath temp. 100–110° C.)

$C_{11}H_{22}ON_2$ MOL. WT. 198.30

| Calc. | Found |
| --- | --- |
| C 66.62, H 11.18, N 14.13 | C 66.38, H 10.57, N 13.91 |

Example 25

This example shows the preparation of N-(p-ethoxyphenyl) 2-dimethylamino 3,3-dimethyl cyclobutane carboxamide. The hydrochloride salt of 2-dimethylamino cyclobutane carbonyl chloride (11.3 g., 0.05 mole) was added portionwise at 0° C. to a stirred solution of 20.6 g. (0.15 mole) of p-phenetidine (redistilled from zinc dust) in 200 ml. of anhydrous ether. The mixture was stirred overnight at room temperature and filtered. The insoluble material, 22 g., was dissolved in 200 ml. of water and treated with saturated sodium bicarbonate solution until precipitation ceased. The precipitate was filtered, washed with water and dried in vacuo over $P_2O_5$. There was 8.5 g. melting at 146–148° C. This was recrystallized from 100 ml. of 40% ethanol (Norit) to give 6.5 g. of long white needles of N-(p-ethoxy phenyl) 2-dimethylamino 3,3-dimethyl cyclobutane carboxamide melting at 149–150° C. ($C_{17}H_{26}O_2N_2$ Mol. Wt. 290.38) with a calculated quantity of C 70.31, H 9.02, N 9.65 and was found upon chemical analysis to be C 70.50, H 8.87, N 9.82.

Example 26

This example shows the preparation of N-phenyl 2-dimethylamino 3,3-dimethyl cyclobutane carboxamide. The hydrochloride salt of 2-dimethylamino 3,3-dimethyl cyclobutane carbonyl chloride 11.3 g. (0.05 mole) was reacted with 14 g. (0.15 mole) of aniline in 200 ml. of anhydrous ether in exactly the same way as Example 25. The workup was identical as in Example 25. This compound, N-phenyl 2-dimethylamino 3,3-dimethyl cyclobutane carboxamide had a melting point of 167–168° C. and has the empirical formula $C_{15}H_{12}ON_2$ Mol. Wt. 246.34 and contained by chemical analysis: C 73.56, H 8.73 and N 11.20 and theory: C 73.13, H 9.00, N 11.37.

Example 27

This example shows the preparation of N,N-N',N'- tetramethyl 3-dimethylamino 4,4-dimethyl cyclobutane, 1,2-dicarboxamide. 3-dimethylamino 4,4-dimethyl cyclobutane 1,2-dicarbonyl chloride hydrochloride, (7.2 g., 0.025 mole) was added portionwise to a stirred Dry-Ice-acetone cooled solution of 5.6 g. (0.125 mole) of dimethylamine in 200 ml. of anhydrous ether. The mixture was stirred in the cold at room temperature overnight. The mixture was filtered and the filtrate was evaporated to dryness in vacuo leaving 4.5 g. of solid melting at 98–100° C. This was twice recrystallized from hexane to give 1.4 g. of white crystals of N,N-N',N'-tetramethyl 3-dimethylamino 4,4-dimethyl cyclobutane 1,2-dicarboxamide ($C_{14}H_{27}O_2N_3$ Mol. Wt. 269.38) melting at 99–100° C. and which on chemical analysis showed C 62.12, H 9.90, N 15.34, theory C 62.42, H 10.10, N 15.60.

Example 28

This example shows the preparation of N,N-diethyl 2-dimethylamino 3,3-dimethyl cyclobutane carboxamide. The reaction of diethylamine with 2-dimethylamino 3,3-dimethyl cyclobutane carbonyl chloride was carried out as described in Example 27 with the exception that 11.3 g. (0.05 mole) of the hydrochloride salt of 2-dimethylamino 3,3-dimethyl cyclobutane carbonyl chloride was added portionwise at 0° C. to 11 g. (0.15 mole) of diethylamine in 200 ml. of anhydrous ether. The reaction mixture was stirred overnight at room temperature before being worked-up as in Example 27. After two distillations there was obtained 9 g. of almost water white N,N-diethyl 2-dimethylamino 3,3-dimethyl cyclobutane carboxamide ($C_{13}H_{26}ON_2$ Mol. Wt. 226.35) boiling at 79° C. at 0.2 mm. (bath temp. 125° C.) which showed by chemical analysis N 12.24 and theory N 12.38.

Example 29

This example shows the preparation of N,N-N',N'-tetraethyl 3-dimethylamino 4,4-dimethyl cyclobutane 1,2-dicarboxamide hydrochloride. In the same manner as in Example 28, 7.2 g. (0.025 mole) of 3-dimethylamino 4,4-dimethyl cyclobutane 1,2-dicarbonyl chloride was reacted with 9.2 g. (0.125 mole) of diethylamine in 200 ml. of anhydrous ether. After diethylamine hydrochloride had been filtered the filtrate was acidified with a 36% solution of hydrogen chloride in absolute ethanol. The precipitate was twice recrystallized from alcohol-ether to yield 6.5 g. of white crystals of N,N-N',N'-tetraethyl 3-dimethylamino 4,4-dimethyl cyclobutane 1,2-dicarboxamide hydrochloride ($C_{18}H_{36}O_2N_3Cl$ Mol. Wt. 361.9) melting at 196–197° C. and which showed on chemical analysis C 59.90, H 9.90, N 11.58 and theory, C 59.73, H 10.03 and N 11.60.

Example 30

This example shows the preparation of 2-amino 3,3-dimethyl cyclobutane carboxamide. A solution of 15 g. of methyl 2-dimethylamino 3,3-dimethyl cyclobutane carboxylate in 60 ml. of methanol was saturated with ammonia at 0° C. The solution was then heated in a 150 cubic centimeter stainless steel autoclave at 110° C. under autogenous pressure for 18 hours. The excess ammonia and solvent were removed in vacuo below 50° C. Scratching the oily residue induced partial crystallization of the mass and the solid was transferred to a funnel with ether. There was 2.6 g. melting at 121–126° C. After two recrystallizations from small volumes of ethyl acetate there was 1.7 g. of white crystals of 2-amino 3,3-dimethyl cyclobutane carboxamide melting at 129–130° C. The structure was confirmed by infra-red spectroscopy and by preparation of a benzene-sulfonamide whose analysis is given below along with that of the product. 2-amino 3,3-dimethyl cyclobutane carboxamide ($C_7H_{14}ON_2$ Mol. Wt. 142.20): Calc. C 59.12, H 9.92, N 19.70; found C 58.95, H 9.60, N 19.23. Benzene sulfonamide monohydrate ($C_{13}H_{18}N_2O_3S\cdot H_2O$ Mol. Wt. 300.31): Calc. C 51.99, H 6.71, N 9.33, O 21.25, S 10.62; found C 52.01, H 6.47, N 9.57, O 21.50, S 10.52.

Example 31

By following the procedure disclosed in Example 21 there can be produced (a) 2-diethylamino, 3,3-dimethyl cyclobutane carboxamide; (b) 2-dimethylamino 3,3-diethyl cyclobutane carboxamide; (c) 2-(1-piperidyl) 3-methyl 3-ethyl cyclobutane carboxamide by simply substituting for the methyl 2-dimethylamino 3,3-dimethyl cyclobutane carboxylate the stoichiometric equivalent quantity respectively of (a) methyl 2-diethylamino 3,3-dimethyl cyclobutane carboxylate; (b) methyl 2-dimethylamino 3,3-diethyl cyclobutane carboxylate; and (c) methyl 2-(2-piperidyl) 3-methyl 3-ethyl cyclobutane carboxylate.

Example 32

By following the procedure disclosed in Example 24 there can be produced (a) N,N-dimethyl 2-dimethylamino 3,3-dimethyl 4-phenyl cyclobutane carboxamide; (b) N,N-dimethyl 2-dimethylamino 3,3-dimethyl 1-phenyl 4-phenyl cyclobutane-1-carboxamide; and (c) N,N-dimethyl 2-(1-piperazyl) 3,3-dimethyl 4-phenyl cyclobutane carboxamide, by simply substituting for the 2-dimethylamino 3,3-dimethyl cyclobutane carbonyl chloride·HCl the stoichiometric equivalent quantity respectively of (a) 2-dimethylamino 3,3-dimethyl 4-phenyl cyclobutane carbonyl chloride·HCl; (b) 2-dimethylamino 3,3-dimethyl 1,4-diphenyl cyclobutane carbonyl chloride·HCl; and (c) 2-(1-piperazyl) 3,3-dimethyl 4-phenyl cyclobutane carbonyl chloride·HCl.

Example 33

By following the procedure of Example 28 there can be prepared (a) N-(m-hydroxyphenyl 2-dimethylamino 3,3-dimethyl cyclobutane carboxamide; and (b) N,N-diallyl 2-dimethylamino 3,3-dimethyl cyclobutane carboxamide, by simply substituting for the diethylamine the equivalent quantity respectively of (a) m-hydroxyaniline and (b) diallylamine.

Example 34

By following the procedure of Example 30, there can be prepared (a) N-methyl 2-methylamino 3,3-dimethyl cyclobutane carboxamide; (b) N-ethyl 2-ethylamino 3,3-dimethyl cyclobutane carboxamide; and (c) N-isopropyl 2-isopropylamino 3,3-dimethyl cyclobutane carboxamide, by simply substituting for the ammonia an equivalent quantity respectively of (a) monomethylamine; (b) monoethylamine; and (c) monoisopropylamine.

Example 35

To obtain 2-methylamino 3,3-dimethyl cyclobutane carboxamide there can be reacted, under the same conditions as Example 34, 2-dimethylamino 3,3-dimethyl cyclobutane carboxamide, with an equivalent quantity of monomethylamine to produce 2-methylamino 3,3-dimethyl cyclobutane carboxamide.

Example 36

This example shows the production of the hydrochloric acid salt of 2-dimethylamino 3,3-dimethyl cyclobutane carbonyl chloride.

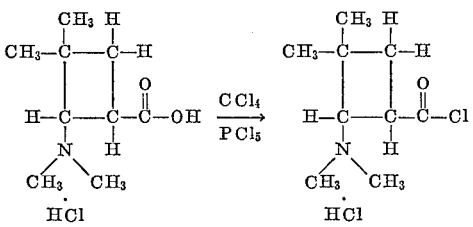

Hydrochloric acid salt of 2-dimethylamino 3,3-dimethyl cyclobutane carboxylic acid Hydrochloric acid salt of 2-dimethylamino 3,3-dimethyl cyclobutane carbonyl chloride To each of three 250 ml. capacity glass pressure bottles there was added 4.6 g. of the hydrochloride salt of 2-dimethylamino 3,3-dimethyl cyclobutane carboxylic acid, 5 g. of phosphorus pentachloride and 100 ml. of carbon tetrachloride. The bottles were shaken at room temperature for 18 hours after which time the bottles were permitted to cool and then were opened. The contents of the three bottles were combined and evaporated in vacuo to a viscous oil to drive off phosphorus oxychloride. The residue was dried in vacuo for two hours whereupon it crystallized to the solid hydrochloride salt of 2-dimethylamino 3,3-dimethyl cyclobutane carbonyl chloride. This compound was mixed with anhydrous ether and filtered. There was obtained 13 grams of hydrochloride salt of 2-dimethylamino 3,3-dimethyl cyclobutane carbonyl chloride which had a melting point of 105° C. to 106° C.

*Example 37*

This example shows the preparation of 2-dimethylamino 3,3-dimethyl cyclobutane carboxamide from the corresponding HCl salt of the acid chloride.

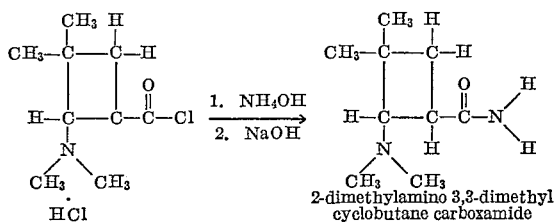

The hydrochloric acid salt of 2-dimethylamino 3,3-dimethyl cyclobutane carbonyl chloride, 5.3 g. (0.025 mole) was slowly added to 50 ml. of concentrated ammonium hydroxide stirred in an ice bath. When addition was complete, the solution thus formed was evaporated to dryness in vacuo. The residue was dissolved in water and made strongly alkaline to a pH of about 12 with 5 N NaOH, which caused a pale yellow oil to separate. The mixture was extracted with four 25 ml. portions of ethyl acetate. The ethyl acetate extracts were dried over sodium sulfate and evaporated to dryness in vacuo. There was obtained 3 g. of 2-dimethylamino 3,3-dimethyl cyclobutane carboxamide melting at 144° C. to 145° C.

What is claimed is:

1. A cyclobutane carboxamide selected from the group consisting of a cyclobutane carboxamide derivative having the formula:

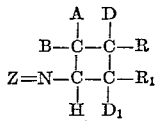

wherein each of A and B is an alkyl radical having from 1 to 4 carbon atoms; $Z=N-$ is an amino radical selected from the group consisting of the primary amino radical, a secondary (lower) alkylamino radical, a tertiary (lower) dialkylamino radical, a saturated monocyclic heterocyclic amino radical having 5 members in the heterocyclic ring wherein one of the ring members is the amino nitrogen atom represented in $Z=N-$, and a saturated monocyclic heterocyclic amino radical having 6 members in the heterocyclic ring wherein one of the ring members is the amino nitrogen atom represented in $Z=N-$; each of D and $D_1$ are members selected from the group consisting of hydrogen and the phenyl radical; and each of R and $R_1$ are members selected from the group consisting of hydrogen, the primary carboxamide radical; a secondary N-alkyl carboxamide radical having from 1 to 8 carbon atoms in the alkyl chain, a secondary N-alkenyl carboxamide radical having from 1 to 8 carbon atoms in the alkyl chain, the secondary N-phenyl carboxamide radical, a secondary (lower) N-alphenyl carboxamide radical, a secondary (lower) N-phenalkyl carboxamide radical, a secondary (lower) N-alkoxyphenyl carboxamide radical, a secondary (lower) N-hydroxyalkyl carboxamide radical, a secondary N-hydroxyphenyl carboxamide radical, a tertiary N,N-dialkyl carboxamide radical having from 1 to 8 carbon atoms in each alkyl chain, a tertiary N,N-dialkenyl carboxamide radical having from 1 to 8 carbon atoms in each alkene chain, the tertiary N,N-diphenyl carboxamide radical, a tertiary (lower) N,N-di(alkphenyl) carboxamide radical, a tertiary (lower) N,N-di(phenalkyl) carboxamide radical, a tertiary (lower) N,N-di(alkoxyphenyl) carboxamide radical, a tertiary (lower) N,N-di(hydroxyalkyl) carboxamide radical, and a tertiary N,N-di(hydroxyphenyl) carboxamide radical provided that at least one of R and $R_1$ is a carboxamide radical and a non-toxic acid addition salt of said cyclobutane carboxamide derivative.

2. A cyclobutane carboxamide of claim 1 wherein each of A and B of the formula are alkyl radicals having from 1 to 4 carbon atoms, each of D, R and $D_1$ is hydrogen, $R_1$ is the primary carboxamide radical and $Z=N-$ is a tertiary (lower) dialkylamino radical.

3. A cyclobutane carboxamide of claim 1 wherein each of A and B of the formula is a (lower) alkyl, each of D, R and $D_1$ is hydrogen, $R_1$ is a tertiary (lower) N,N-dialkyl carboxamide radical and $Z=N-$ is a tertiary (lower) dialkylamino radical.

4. A compound of the formula

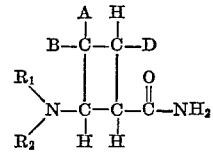

wherein A and B are lower alkyl; D is selected from the group consisting of H and phenyl; $R_1$ and $R_2$ are selected from the group consisting of lower alkyl and taken together with the nitrogen atom to which they are attached, piperidino, pyrrolidino, piperazino, and morpholino.

5. 2-dimethylamino 3,3-dimethyl cyclobutane carboxamide.

6. 2-amino 3,3-dimethyl cyclobutane carboxamide.

7. N-methyl 2-dimethylamino 3,3-dimethyl cyclobutane carboxamide.

8. N-phenyl 2-dimethylamino 3,3-dimethyl cyclobutane carboxamide.

9. N-(p-ethoxyphenyl) 2-dimethylamino 3,3-dimethyl cyclobutane carboxamide.

10. N,N-dimethyl 2-dimethylamino 3,3-dimethyl cyclobutane carboxamide.

11. N,N-N',N'-tetramethyl 3-dimethylamino 4,4-dimethyl cyclobutane 1,2-dicarboxamide.

12. 2-(1-piperidyl) 3-methyl 3-ethyl cyclobutane carboxamide.

13. N,N-diallyl 2-dimethylamino 3,3-dimethyl cyclobutane carboxamide.

14. N-methyl 2-methylamino 3,3-dimethyl cyclobutane carboxamide.

15. 2-methylamino 3,3-dimethyl cyclobutane carboxamide.

16. 3-dimethylamino 4,4-dimethyl cyclobutane 1,2-dicarboxamide.

17. 2-dimethylamino 3,3-dimethyl 1-phenyl cyclobutane carboxamide.

18. N,N-di(p-hydroxyphenyl) 2-(1-piperazyl) 3-methyl 3-ethyl cyclobutane carboxamide.

19. N-hydroxymethyl 2-dimethylamino 3,3-dimethyl cyclobutane carboxamide.

20. N,N-di(2-hydroxyethyl) 2-methylisopropylamino 3,3-dibutyl cyclobutane carboxamide.

21. N,N-di(p-methoxyphenyl) 2-methylamino 3,3-dimethyl 4-phenyl cyclobutane carboxamide.

22. A cyclobutane derivative having the following formula:

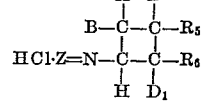

wherein each of A and B is a (lower) alkyl radical;

3,133,924

17

Z=N— is a tertiary amino radical selected from the group consisting of a (lower) dialkyl-amino radical, a saturated monocyclic heterocyclic amino radical having 5 members in the heterocyclic ring wherein one of the ring members is the amino nitrogen represented in Z=N—, and a saturated monocyclic heterocyclic amino radical having 6 members in the heterocyclic ring wherein one of the ring members is the amino nitrogen represented in Z=N—; $R_5$ and $R_6$ are members selected from the group consisting of hydrogen and the carbonyl chloride radical, each of D and $D_1$ is a member selected from the group consisting

18 of hydrogen and the phenyl radical, and provided that at least one of $R_5$ and $R_6$ is the carbonyl chloride radical.

23. A cyclobutane derivative of claim 35 wherein each of A and B of the formula are alkyl radicals having from 1 to 2 carbon atoms in each alkyl chain, each of D, $R_5$ and $D_1$ is hydrogen, $R_6$ is the carbonyl chloride, and Z=N— is a tertiary (lower) dialkylamino radical.

24. The hydrochloric acid salt of 2-dimethylamino 3,3-dimethyl cyclobutane carbonyl chloride.

No references cited.

---

UNITED STATES PATENT OFFICE
CERTIFICATE OF CORRECTION

Patent No. 3,133,924            May 19, 1964

Armin G. Wilson et al.

It is hereby certified that error appears in the above numbered patent requiring correction and that the said Letters Patent should read as corrected below.

Column 2, line 19, for "N,N'-" read -- N,N- --; column 3, line 23, for "4,4'-dimethyl" read -- 4,4-dimethyl --; column 4, line 73, for "administtered" read -- administered --; column 8, lines 1 and 51, for "Formula", each occurrence, read -- Formula 3 --; column 9, line 46, for "M.P." read -- B.P. --; column 14, line 12, for "2-(2-piperidyl)" read -- 2-(1-piperidyl) --; line 32, for "N-(m-hydroxyphenyl" read -- N-(m-hydroxyphenyl) --; column 18, line 3, for the claim reference numeral "35" read -- 22 --.

Signed and sealed this 29th day of September 1964.

(SEAL)
Attest:

ERNEST W. SWIDER
Attesting Officer

EDWARD J. BRENNER
Commissioner of Patents

UNITED STATES PATENT OFFICE

CERTIFICATE OF CORRECTION

Patent No. 3,133,924 May 19, 1964

Armin G. Wilson et al.

It is hereby certified that error appears in the above numbered patent requiring correction and that the said Letters Patent should read as corrected below.

Column 2, line 19, for "N,N'-" read -- N,N- --; column 3, line 23, for "4,4'-dimethyl" read -- 4,4-dimethyl --; column 4, line 73, for "administtered" read -- administered --; column 8, lines 1 and 51, for "Formula", each occurrence, read -- Formula 3 --; column 9, line 46, for "M.P." read -- B.P. --; column 14, line 12, for "2-(2-piperidyl)" read -- 2-(1-piperidyl) --; line 32, for "N-(m-hydroxyphenyl" read -- N-(m-hydroxyphenyl) --; column 18, line 3, for the claim reference numeral "35" read -- 22 --.

Signed and sealed this 29th day of September 1964.

(SEAL)
Attest:

ERNEST W. SWIDER
Attesting Officer

EDWARD J. BRENNER
Commissioner of Patents